(12) United States Patent
Seibold et al.

(10) Patent No.: US 9,943,084 B2
(45) Date of Patent: *Apr. 17, 2018

(54) FAT COMPOSITIONS AND RELATED METHODS, INCLUDING SHORTENING PARTICLES AND SHORTENING COMPOSITIONS WITHOUT ADDED NON-INTERESTIFIED HARDSTOCK FAT, AND RELATED PRODUCTS

(75) Inventors: Jon Duke Seibold, Mahtomedi, MN (US); Braden J. Erickson, Eden Prairie, MN (US); Alan A. Oppenheimer, Savage, MN (US)

(73) Assignee: General Mills, Inc., Minneapolis, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/467,439

(22) Filed: May 9, 2012

(65) Prior Publication Data
US 2012/0308708 A1    Dec. 6, 2012

Related U.S. Application Data

(63) Continuation of application No. PCT/US2012/035143, filed on Apr. 26, 2012.
(Continued)

(51) Int. Cl.
*A23D 9/00* (2006.01)
*A21D 2/16* (2006.01)
(Continued)

(52) U.S. Cl.
CPC .......... *A21D 2/16* (2013.01); *A21D 13/16* (2017.01); *A23D 7/003* (2013.01); *A23D 7/02* (2013.01);
(Continued)

(58) Field of Classification Search
None
See application file for complete search history.

(56) References Cited

U.S. PATENT DOCUMENTS 3,384,494 A    5/1968    Colby et al.
3,714,210 A    1/1973    Schweiger et al.
(Continued)

FOREIGN PATENT DOCUMENTS

EP    1197153    2/2005
GB    855349    11/1960
(Continued)

OTHER PUBLICATIONS

Microsoft Excel, pp. 1-3, help pages within for calucating slope, 2017.*

(Continued)

*Primary Examiner* — Tamra L Dicus
(74) *Attorney, Agent, or Firm* — Diederiks & Whitelaw, PLC; John L. Crimmins, Esq.; Rachel A. Kahler (57) ABSTRACT

Described are fat compositions (e.g., shortening composition and shortening particles) that are suitable for use in preparing batter or dough products such as biscuits, pizza crusts, pot pie crusts, cinnamon rolls, or dry mixes for same; the fat compositions can be low in trans fatty acids with moderate levels of saturated fatty acids. For example, fat compositions may comprise less than about 2% wt. total trans fatty acids and a total of less than about 70% wt. saturated fatty acids and trans fatty acids.

9 Claims, 5 Drawing Sheets

Related U.S. Application Data (60) Provisional application No. 61/483,951, filed on May 9, 2011.

(51) Int. Cl.
| | | |
|---|---|---|
| *A23D 7/00* | (2006.01) | |
| *A23D 7/02* | (2006.01) | |
| *A23D 7/04* | (2006.01) | |
| *A23D 9/02* | (2006.01) | |
| *A23D 9/04* | (2006.01) | |
| *C11C 3/10* | (2006.01) | |
| *A21D 13/16* | (2017.01) | |

(52) U.S. Cl.
CPC ............... *A23D 7/04* (2013.01); *A23D 9/02* (2013.01); *A23D 9/04* (2013.01); *C11C 3/10* (2013.01)

(56) References Cited

U.S. PATENT DOCUMENTS

| | | | |
|---|---|---|---|
| 3,800,056 A | 3/1974 | Mitchell, Jr. | |
| 3,859,445 A | 1/1975 | Langhans | |
| 3,859,447 A | 1/1975 | Sreenivasan | |
| 3,950,561 A | 4/1976 | Collins | |
| 3,985,911 A | 10/1976 | Kriz et al. | |
| 4,018,755 A | 4/1977 | Wang | |
| 4,211,800 A | 7/1980 | Scharschmidt et al. | |
| 4,268,534 A | 5/1981 | Kawada et al. | |
| 4,390,561 A | 6/1983 | Blair et al. | |
| 4,447,462 A | 5/1984 | Tafuri et al. | |
| 4,590,086 A | 5/1986 | Takahashi et al. | |
| 4,810,513 A | 5/1989 | Van Liere | |
| 4,839,187 A | 6/1989 | Mai et al. | |
| 4,883,684 A | 11/1989 | Yang | |
| 4,891,233 A | 1/1990 | Belanger et al. | |
| 5,064,677 A | 11/1991 | Cain et al. | |
| 5,147,670 A | 9/1992 | Cebula et al. | |
| 5,190,868 A | 3/1993 | Kokusho et al. | |
| 5,215,779 A | 6/1993 | Dake et al. | |
| 5,306,516 A * | 4/1994 | Letton et al. | 426/531 |
| 5,407,695 A | 4/1995 | Wheeler et al. | |
| 5,431,948 A | 7/1995 | Cain et al. | |
| 5,472,728 A | 12/1995 | Miller et al. | |
| 5,534,284 A * | 7/1996 | Corrigan et al. | 426/531 |
| 5,578,334 A | 11/1996 | Sundram et al. | |
| 5,612,080 A | 3/1997 | Gruetzmacher et al. | |
| 5,667,837 A | 9/1997 | Broomhead et al. | |
| 5,683,738 A | 11/1997 | Gruetzmacher et al. | |
| 5,686,131 A | 11/1997 | Sato et al. | |
| 5,710,365 A | 1/1998 | Kerr et al. | |
| 5,756,142 A | 5/1998 | Reckweg et al. | |
| 5,843,497 A | 12/1998 | Sundram et al. | |
| 5,866,187 A | 2/1999 | Kines | |
| 5,874,117 A | 2/1999 | Sundram et al. | |
| 5,908,655 A | 6/1999 | Doucet | |
| 5,972,412 A * | 10/1999 | Sassen | A23D 7/001 426/603 |
| 5,989,618 A | 11/1999 | Thurman et al. | |
| 6,013,255 A | 1/2000 | Edens et al. | |
| 6,022,577 A * | 2/2000 | Chrysam et al. | 426/601 |
| 6,022,578 A | 2/2000 | Miller | |
| 6,033,703 A | 3/2000 | Roberts et al. | |
| 6,033,710 A | 3/2000 | Miller et al. | |
| 6,068,876 A | 5/2000 | Miller et al. | |
| 6,096,351 A * | 8/2000 | Sassen | 426/33 |
| 6,106,885 A | 8/2000 | Huizinga et al. | |
| 6,156,370 A | 12/2000 | Huizinga et al. | |
| 6,162,483 A | 12/2000 | Wester | |
| 6,228,417 B1 | 5/2001 | Hidaka et al. | |
| 6,229,033 B1 * | 5/2001 | Knowlton | 554/223 |
| 6,231,914 B1 | 5/2001 | Huizinga et al. | |
| 6,312,751 B1 | 11/2001 | Cain et al. | |
| 6,312,752 B1 * | 11/2001 | Lansbergen et al. | 426/607 |
| 6,322,842 B1 | 11/2001 | Reddy et al. | |
| 6,406,737 B1 | 6/2002 | Cain et al. | |
| 6,423,363 B1 | 7/2002 | Traska et al. | |
| 6,517,884 B1 | 2/2003 | Bauer-Plank et al. | |
| 6,544,579 B1 | 4/2003 | Landon | |
| 6,630,172 B2 | 10/2003 | Batarseh | |
| 6,649,202 B1 | 11/2003 | Huxel | |
| 6,777,018 B2 | 8/2004 | Floeter et al. | |
| 6,863,915 B2 | 3/2005 | Huxel | |
| 6,929,816 B2 | 8/2005 | Wester | |
| 6,932,996 B2 * | 8/2005 | Huxel | 426/291 |
| 7,105,195 B2 | 9/2006 | Plank et al. | |
| 7,108,888 B2 | 9/2006 | Floeter | |
| 7,118,773 B2 | 10/2006 | Floeter et al. | |
| 7,223,435 B2 | 5/2007 | Besselink et al. | |
| 7,229,653 B2 | 6/2007 | Sundram et al. | |
| 7,247,335 B2 | 7/2007 | Floter | |
| 7,498,453 B2 | 3/2009 | Van Toor et al. | |
| 7,524,524 B2 | 4/2009 | Floeter | |
| 7,547,459 B2 | 6/2009 | Plank et al. | |
| 8,435,592 B2 * | 5/2013 | Erickson | A23D 9/04 426/607 |
| 8,518,470 B2 * | 8/2013 | Erickson | A21D 2/16 426/607 |
| 2002/0071896 A1 | 6/2002 | Palmer et al. | |
| 2002/0114874 A1 | 8/2002 | Floeter et al. | |
| 2002/0119240 A1 | 8/2002 | Mazurek et al. | |
| 2002/0142072 A1 | 10/2002 | Huxel | |
| 2003/0082289 A1 | 5/2003 | Huxel | |
| 2003/0113427 A1 | 6/2003 | Floeter et al. | |
| 2003/0161934 A1 | 8/2003 | Floter | |
| 2003/0161935 A1 | 8/2003 | Kakuda et al. | |
| 2003/0175402 A1 | 9/2003 | Wester | |
| 2003/0175403 A1 | 9/2003 | Gurin | |
| 2004/0028622 A1 | 2/2004 | Gurin | |
| 2004/0047969 A1 | 3/2004 | Wester et al. | |
| 2004/0071856 A1 | 4/2004 | Floeter | |
| 2004/0071857 A1 | 4/2004 | Besselink et al. | |
| 2004/0197463 A1 | 10/2004 | Gottemoller | |
| 2004/0219277 A1 | 11/2004 | Wester | |
| 2005/0042332 A1 | 2/2005 | Plank et al. | |
| 2005/0123668 A1 | 6/2005 | Kodali et al. | |
| 2005/0136167 A1 | 6/2005 | Kraklow et al. | |
| 2005/0220965 A1 | 10/2005 | Floeter | |
| 2005/0233056 A1 | 10/2005 | Jahaniaval | |
| 2005/0249855 A1 | 11/2005 | Marangoni et al. | |
| 2005/0249856 A1 | 11/2005 | Marangoni et al. | |
| 2005/0276900 A1 | 12/2005 | Ullanoormadam | |
| 2006/0013934 A1 | 1/2006 | Villagran et al. | |
| 2006/0019021 A1 | 1/2006 | Plank et al. | |
| 2006/0058401 A1 | 3/2006 | Ishikawa et al. | |
| 2006/0105092 A1 | 5/2006 | Miller | |
| 2006/0280855 A1 | 12/2006 | Van Den Berg et al. | |
| 2006/0286272 A1 | 12/2006 | Hanselmann | |
| 2006/0292276 A1 | 12/2006 | Huxel et al. | |
| 2007/0071875 A1 | 3/2007 | Wester | |
| 2007/0128340 A1 | 7/2007 | Andrews et al. | |
| 2007/0160739 A1 | 7/2007 | Kuwabara et al. | |
| 2007/0178218 A1 | 8/2007 | Yager et al. | |
| 2007/0185340 A1 | 8/2007 | Van Toor et al. | |
| 2007/0243308 A1 | 10/2007 | Yu et al. | |
| 2007/0269468 A1 * | 11/2007 | Bach et al. | 424/401 |
| 2008/0118624 A1 | 5/2008 | Boer et al. | |
| 2008/0175958 A1 | 7/2008 | Staeger et al. | |
| 2008/0268130 A1 | 10/2008 | Bons et al. | |
| 2009/0029025 A1 | 1/2009 | Pernetti | |
| 2009/0047409 A1 | 2/2009 | Schreiber et al. | |
| 2009/0123619 A1 | 5/2009 | Narine et al. | |
| 2009/0142467 A1 | 6/2009 | Aldred et al. | |
| 2009/0220653 A1 | 9/2009 | Doucet | |
| 2009/0311387 A1 * | 12/2009 | Plank | A21D 2/16 426/94 |
| 2011/0097471 A1 | 4/2011 | Arlinghaus | |
| 2012/0064193 A1 * | 3/2012 | Erickson | A21D 2/16 426/61 |

(56) References Cited

U.S. PATENT DOCUMENTS

| | | |
|---|---|---|
| 2012/0064195 A1 | 3/2012 | Erickson et al. |
| 2015/0050412 A1* | 2/2015 | Erickson ................ A21D 2/02 426/555 |

FOREIGN PATENT DOCUMENTS

| | | |
|---|---|---|
| GB | 1005804 | 9/1965 |
| GB | 2081293 | 2/1982 |
| GB | 2210544 | 6/1986 |
| GB | 2176143 | 12/1986 |
| JP | 60145055 | 7/1985 |
| JP | 61001343 | 1/1986 |
| JP | 61095098 | 5/1986 |
| JP | 62273293 | 11/1987 |
| JP | 7313086 | 12/1995 |
| JP | 2000102345 | 4/2004 |
| JP | 2007174988 | 7/2007 |
| JP | 2007252203 | 10/2007 |
| JP | 2007282606 | 11/2007 |
| JP | 2008220290 | 9/2008 |
| JP | 2008263790 | 11/2008 |
| JP | 2008278833 | 11/2008 |
| JP | 2009072096 | 4/2009 |
| WO | WO-92/015200 | 9/1992 |
| WO | WO-03/080779 | 10/2003 |
| WO | WO-04/108874 | 12/2004 |
| WO | WO-05/012471 | 2/2005 |
| WO | WO-06/014322 | 2/2006 |
| WO | WO-06/133124 | 12/2006 |
| WO | WO-07/061372 | 5/2007 |
| WO | WO-09/130928 | 10/2009 |
| WO | WO-10/007802 | 1/2010 |
| WO | WO 2011084059 A1 * | 7/2011 |
| WO | 2012/106176 | 9/2012 |

OTHER PUBLICATIONS

Math is Fun, slope calculation, https://www.mathsisfun.com/equation_of_line.html, pp. 1-6, 2016.*

"ADM Product Code 106-150", Technical Data Sheet, ADM—Packaged Oils, p. 1.

"Determination of Solid Fat Content in Edible Oils & Fats by the Official Direct Method (AOCS Cd 16b-93)" Application Note13, Part No. SFC:-10-09, Oxford Instruments, pp. 2.

"Dritex S Flakes", Product Data Sheet, ACH Food Companies, Inc., Mar. 30, 2007, pp. 2.

"Dropping Point", Sampling and Analysis of Commercial Fats and Oils, AOCS Official Method Cc 18-80, Reapproved 1997, Revised 2001, pp. 1-2.

"Solid Fat Content (SFC) by Low-Resolution Nuclear Magnetic Resonance—The Direct Method" Sampling & Analysis Commercial Fats&Oils, AOCS Official Method Cd 16b-93, 1991 pp. 1-10.

Latondress, E. G., "Formulation of Products from Soybean Oil", JAOCS 58, pp. 185-187 (Mar. 1981).

List, G. R. et al. "Margarine and Shortening Oils by Interesterification of Liquid and Trisaturated Triglycerides", JAOCS 72 (3), pp. 379-382 (1995).

Louis H. Going, "Interesterification Products and Processes", Journal of the American Oil Chemists' Society, Sep. 1967, vol. 41, 414A.

Oil List and Lye Table available at http://home.earthlink.net/-skinesscentuals/LyeTable.htm.

Wiedermann, L. H., "Margarine and Margarine Oil, Formulation and Control", JAOCS 55, pp. 823-829, (1978).

* cited by examiner

FIG. 1A Comp A

FIG. 1B, Blend 1

Figure 1A & B. Comparative Composition A (0% added hardstock & 36% Stearic Acid) does not flake where as Blend 1 (0% added hardstock & 40% Stearic Acid) produces shortening particles (e.g. discrete flakes)

Figure 2. Demonstrates that Blends 1 & 2 in bakery product are equivalent to product attributes having commercially available fat w/ trans fat & Composition G Figure 3. Shows the SFC profile of individual compositions and the regions

Fig. 4

FAT COMPOSITIONS AND RELATED METHODS, INCLUDING SHORTENING PARTICLES AND SHORTENING COMPOSITIONS WITHOUT ADDED NON-INTERESTIFIED HARDSTOCK FAT, AND RELATED PRODUCTS

CROSS-REFERENCE TO RELATED APPLICATIONS

This application is a continuation of International patent application, Serial Number PCT/US12/35143, filed Apr. 26, 2012, and claims the benefit of priority under 35 U.S.C. 119(e)(1), a provisional patent application Ser. No. 61/483,951, filed May 9, 2011, which is incorporated herein by reference in its entirety.

FIELD

The invention relates to fat compositions that include shortening particles, including compositions prepared from interesterified base oil.

BACKGROUND

Dough compositions for use in bakery products (e.g., biscuits) commonly include fat, water, flour, eggs, and a leavening agent (e.g., yeast) as the primary ingredients. The fats that are used in these products are commonly triglyceride-based fats that typically contain fairly high levels of saturated fats and/or trans fatty acids. With the present trend towards healthier food products, there is a high demand for bakery products that contain healthier fat compositions (i.e., fats having a reduced amount of saturated fats and/or trans fatty acids). In order to provide low trans fatty acid compositions, formulators have often used fat ingredients that are high in saturated fatty acids, for example, palm kernel oil and coconut oil. These oils are expensive and are typically obtained from non-U.S. sources. In view of this, alternative fat compositions that are low in trans fats and/or saturated fats are very desirable. Shortening compositions that can be prepared from non-tropical oils, such as soybean oil, are also very desirable.

SUMMARY

The present invention relates to fat compositions such as interesterified base oils, shortening compositions, and shortening particles, that are suitable for use in preparing batter or dough products such as biscuits, pizza crusts, pot pie crusts, cinnamon rolls, and various bread doughs, and dry mixes for any of these. In many embodiments the fat compositions are low in trans fatty acids and in saturated fatty acids. For example, a fat composition (e.g., interesterified base oil, shortening composition, or shortening particles) may contain less than about 2 weight percent total trans fatty acids and a total of less than about 70 weight percent saturated fatty acids and trans fatty acids, based on a total weight of the relevant fat composition, e.g., interesterified base oil, shortening composition, or the shortening particles.

Conventionally, fat compositions such as shortening particles used in bakery products have fairly steep slope (m) for the Solid Fat Content (SFC) profile (i.e., a high SFC at 10° C. (50° F.) and low SFC at 40° C. (104° F.)). A fairly steep slope is considered desirable because it is characteristic of a fat composition that melts quickly when placed in the mouth thereby avoiding a "waxy" mouth feel when the fat is consumed as part of a bakery product. These compositions are typically based upon tropical base oils such as palm kernel oil and coconut oil that are expensive and are high in saturated fatty acids. In contrast to this, fat compositions of the invention can have a relatively flat slope (i.e., a relatively smaller negative slope) for the SFC profile. Unexpectedly, these compositions, which exhibit a smaller negative slope, are still quite useful or even advantageous for use in preparing baked goods (e.g., biscuits) that are acceptable to consumers. Additionally, a relatively more flat SFC slope is desirable because fat compositions (e.g., shortening particles) prepared with a composition having a relatively more flat SFC profile are more stable as a particle or flake, because the composition does not melt as easily with small temperature variations that may occur during manufacturing, shipping, and storage conditions. Advantageously, in many embodiments, a fat composition (e.g., shortening particles) can have a low trans fatty acid content, a low saturated fatty acid content, or both.

In many embodiments, a fat composition comprises interesterified base oil made by interesterifying two different fat components that include: 1) a high melt point fat component, and 2) a low melt point fat component. Each of these two different fat components can preferably be a non-tropical base oil, which includes a non-tropical oil in a natural form (natural oil) or a processed or refined derivative thereof such as a purified oil, a fully or partially hydrogenated oil, or a fractionated oil. The non-tropical base oil can be in the form of a liquid, solid, or semi-solid, at room temperature, depending on the type of non-tropical base oil, and optional processing.

As used herein the term "non-tropical base oil" refers to an oil (solid, liquid, or semi-solid) that is derived from a plant or other organism that is not a "tropical" plant or other organism—the term "non-tropical base oil" excludes "tropical oils." The term "tropical oil" as used herein is given its ordinary meaning in the food and food ingredient arts, referring to any of several oils of tropical trees or plants, such as coconut oil, palm oil, and palm kernel oil, that contain low amounts of polyunsaturated fatty acid and are high in saturated fatty acids (Coconut oil is considered to contain about 92% saturated fat; palm kernel oil contains about 82% saturated fat, and palm oil contains about 50% saturated fat). A "tropical" tree or plant is one that is characteristic of or capable of growing naturally in a "tropical" region or climate, e.g., one that is frost-free with temperatures high enough to support year-round plant growth given sufficient moisture (e.g., tropical Florida); alternately, a "tropical" climate according to the Köppen climate classification, which is a non-arid climate in which all twelve months have mean temperatures above 18 C (64 F).

Examples of non-tropical base oils include oils obtained from soybean, rapeseed (canola), sunflower, peanut, hazelnut, walnut, cottonseed, olive, corn, grapeseed, rice bran, sesame, safflower, linseed/flax, oat, and wheat germ. These non-tropical base oils in their natural forms include relatively lower amounts of saturated fat compared to tropical oils, such as below about 27 percent saturated fat (cottonseed oil is about 26 percent saturated fat by weight), or less than about 16 percent saturated fat (soybean oil is about 15 percent saturated fat by weight). Also within the scope of non-tropical oils are oils derived from animals (e.g., lard, tallow, butter), microorganisms, and plants. The use of non-tropical base oils is preferred because tropical base oils (e.g., palm, palm kernel oil, coconut, shea butter, and allanblackia) are expensive and typically contain high amounts of saturated fatty acids. In addition, some types of tropical oils (e.g., palm oil and palm kernel oil) have been associated with destruction of the rainforest. In many embodiments, the interesterified base oils are prepared from greater than about 50% wt. non-tropical base oils; or about 75% wt. or greater non-tropical base oils; or about 90% wt. or greater non-tropical base oils; or about 99% wt. or greater non-tropical base oils. In an exemplary embodiment, the interesterified base oil is prepared from 100% wt. non-tropical base oils, such as soybean oil.

Embodiments of fat compositions of the invention can exhibit a Solid Fat Content (SFC) profile that fits the equation:

$$y=mx+b$$

where:
y is the SFC in % solids;
m is the slope of the SFC profile which ranges from about
−1.0 to −1.4 (% solids/° C.);
x is the temperature in ° C.; and
b is the intercept of the SFC profile which ranges from about 65 to about 95 (% solids); and
wherein the shortening composition has a Mettler Dropping Point (MDP) of about 54° C. to about 66° C., or a MDP of from about 57° C. to about 63° C.

In one aspect, the invention relates fat compositions such as shortening particles, interesterified base oil, and shortening compositions. Any of these can contain interesterified base oil having a stearic acid content of about 38 weight percent to about 60 weight percent, and can exclude any added non-interesterified hardstock fat. The invention also relates to dough compositions and dry mixes that contain a fat composition as described.

BRIEF DESCRIPTION OF THE DRAWINGS

The present invention will be further explained with reference to the attached figures, wherein like structure is referred to by like numerals views, and wherein.

DETAILED DESCRIPTION

The embodiments of the invention described herein are not intended to be exhaustive or to limit the invention to the precise forms disclosed in the following detailed description. Rather, the embodiments are chosen and described so that others skilled in the art can appreciate and understand the principles and practices of the invention.

Prior work done by the present Assignee has identified shortening compositions and shortening particles, including those made with interesterified base oil combined with non-interesterified hardstock fat, and that are capable of being formed into a shortening particle (such as a flake or chip). See, Assignee's co-pending U.S. patent application Ser. No. 12/880,685, filed Sep. 13, 2010; and Ser. No. 13/017,942, filed Jan. 31, 2011; Ser. No. 12/017,522, filed Jan. 22, 2008; and Ser. No. 12/481,146, filed Jun. 9, 2009; these documents being incorporated herein by reference. Flakes or chips are formats of shortening particles that can be useful to in baked products, e.g., to achieve a desired discrete fat distribution.

Embodiments of fat compositions as described (e.g., interesterified base oils, shortening compositions, shortening particles (flakes, chips, etc.)) can contain, be prepared from, consist of, or consist essentially of interesterified base oil. These fat compositions may but are not required to additionally contain (and optionally may specifically exclude) any added fat, such as added non-interesterified hardstock fat ingredient. Exemplary fat compositions (e.g., shortening chips) can be prepared from ingredients that include, consist of, or consist essentially of interesterified base oil having a stearic acid (C18:0) content in a range from about 38 weight percent to about 60 weight percent. In other specific embodiments, shortening chips can be prepared from ingredients that include, consist of, or consist essentially of interesterified base oil having a stearic acid (C18:0) content in a range from about 40 weight percent to about 52 weight percent. This allows for the potential of a simplified nutritional label declaration. In addition, certain studies have shown that stearic acid is cholesterol "neutral" as opposed to certain other saturated fats which are believed to raise the LDL (bad) cholesterol levels. When used in this manner, "stearic acid content" refers to the weight percent of the C18:0 (stearic acid) compared to the total amount of fat in a composition (e.g., shortening composition, shortening particle, or interesterified base oil). Stearic acid content can be measured by standard techniques, such as by gas chromatography.

Figure 1A:
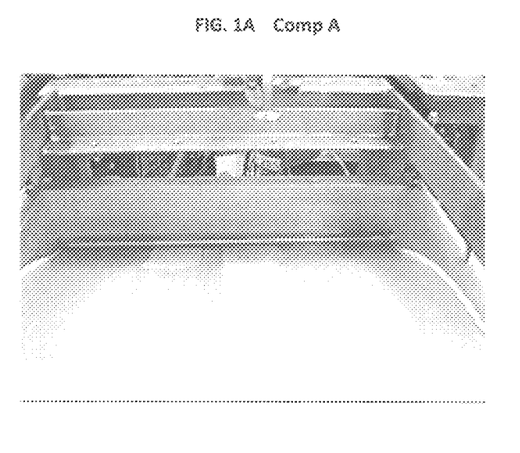
FIG. 1A is a photograph showing a shortening composition not able to be made into a shortening particle.
Figure 1B:
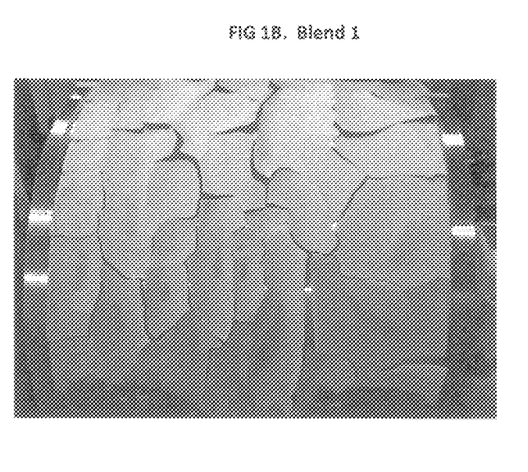
FIG. 1B is a photograph showing a representative embodiment of a shortening particle composition of the invention being made.

Shortening particles as described herein can be in the form of a plurality of discrete shortening particles that are individually separate and distinct from one another. The shortening particles may have any desired shape, for example, chips, flakes, rods, spheres, pellets, cones, cylinders, cubes, etc., or of any other regular and irregular shape. At room temperature, individual shortening particles do not adhere to one another to an appreciable degree. This allows the shortening particles to be handled, dispensed, and applied to a dough composition as individual particles rather than as a single solid. A photograph showing representative shortening particles being made is shown in FIG. 1B.

In many embodiments, the shortening particles have a thickness dimension that ranges from about 0.02 inches to about 0.10 inches, more typically about 0.03 inches to about 0.07 inches, and most typically about 0.035 inches to about 0.055 inches. The color of the particles can range from white to grey with a corresponding opaque to translucent transparency scale. The particles may optionally include other ingredients or additives for use in a dough such as a flavor or a sweetener, and may be colored (e.g., yellow, red, brown). The particles can be texturally described as hard (e.g., rigid) and brittle, to rather soft and pliable, but typically will fracture and break upon sufficient force (deformation). The surface of the particle may also exhibit some smear under a shear force resulting in residue on the article applying the shearing force.

In many embodiments, shortening particles can comprise, consist of, or consist essentially of, interesterified base oil that includes stearic acid in an amount that allows the formation of the particles, and that allows the particles to be used for preparing a baked dough product. In many embodiments, the interesterified base oil can be prepared from a combination of two fat components, including a high melt point fat component and a low melt point fat component.

Optionally, materials used to prepare an interesterified base oil as described can consist of or consist essentially of fat components. According to preferred embodiments, each fat component can be (e.g., consist of or consist essentially of) a relatively pure, natural, processed, or other derivative of a non-tropical base oil, for example, soybean oil, including purified, processed, or otherwise modified forms of non-tropical base oils such hydrogenated non-tropical base oil, e.g., hydrogenated (e.g., fully hydrogenated) soybean oil.

An interesterified base oil can be derived from at least two different fat components, wherein the combined stearic acid content of the two fat components prior to interesterification is in a range from about 38 weight percent to about 60 weight percent, e.g., from about 40 weight percent to about 52 weight percent. Upon interesterification, resulting in re-arrangement of fatty acid components of triglyceride molecules of the original (reactant) fat components, the resultant interesterified base oil will exhibit the same stearic acid content as the total stearic acid content of the original (reactant) fat components used to prepare the interesterified base oil.

Interesterified base oils are known ingredients derived from fat components by interesterification. The term "interesterified base oil" is understood to refer to the fat composition that results from the interesterification of one or more fat component. At room temperature, an interesterified base oil may take the form of a liquid, or (as described herein) a solid, or a particle. The product interesterified base oil produced by interesterification of two different fat components will not continue to contain the two different original fat components in their original forms. Upon interesterification of reactant base oils, the product interesterified base oil will contain the product of the interesterification process, the "interesterified base oil," which is the resultant fat composition that contains the original fat components (mainly triglycerides), with the fatty acid components of each of the original triglycerides rearranged between the original triglyceride molecules, i.e., interesterified. As is understood, an "interesterified base oil" that is said to "comprise" two or more different fat components refers to an interesterified base oil derived from or prepared by interesterification of the two or more different fat components.

As used herein, a high melt point fat component is a fat component that has a melting point, as measured by Mettler Dropping Point, of 100 degrees Fahrenheit or greater, e.g., 120 degrees Fahrenheit or greater, or 130 degrees Fahrenheit or greater, or 140 degrees Fahrenheit or greater, 150 degrees Fahrenheit or greater, 160 degrees Fahrenheit or greater, or 170 degrees Fahrenheit or greater. A low melt point fat component is a fat component that has a melting point, as measured by Mettler Dropping Point, that is below 100 degrees Fahrenheit, e.g., that is 80 degrees Fahrenheit or lower, or 70 degrees Fahrenheit or lower, such as 40 degrees Fahrenheit or lower, 20 degrees Fahrenheit or lower, or 0 degrees Fahrenheit or lower.

The amount of stearic acid in an interesterified base oil can be adjusted based on the stearic acid content of different fat components used to prepare the interesterified base oil (e.g., the type of fat components and the degree of saturation or hydrogenation of fatty acids of the different fat components). Different fat components will include different amounts of stearic acid (i.e., exhibit different stearic acid content.) For example, a high stearic acid-containing component such as a hydrogenated soybean oil can be interesterified with a low stearic acid-containing component such as non-hydrogenated soybean oil, to produce an interesterified base oil having a stearic acid content as described herein.

The amount of stearic acid in an interesterified base oil can be also adjusted based on the relative amounts of (the ratio of) different fat components used to prepare the interesterified base oil, e.g. a ratio of low melt point fat component (e.g., a liquid oil that exhibits a relatively lower stearic acid content) to high melt point fat component (e.g., a fully hydrogenated oil that exhibits a relatively higher stearic acid content) prior to interesterification. By adjusting the relative amount of low melt point fat component to high melt point fat component, a resultant interesterified base oil (and shortening composition, shortening particles, etc.) can be obtained as desired, having useful or desired mechanical and organoleptic properties. Useful or preferred relative amounts of high melt point fat component and low melt point fat component can result in an interesterified base oil capable of being processed into shortening particles (e.g., flakes or chips) as described, and useful for preparing a dough or baked dough product.

Preferred relative amounts of high and low melt point fat components can also be selected to result in a dough prepared from the shortening composition having a desired combination of taste, feel, texture, and aesthetic properties. In certain preferred embodiments, interesterified base oil can be prepared from about 65 weight percent to about 20 weight percent low melt point fat component (e.g., liquid (at room temperature) oil such as liquid soybean oil) and from about 35 to about 80 weight percent high melt point fat component (e.g. fully hydrogenated oil such as fully hydrogenated soybean oil, which is a liquid at room temperature).

Shortening particle compositions as described may comprise, consist of, or consist essentially of, interesterified base oil as described. Useful base oil compositions (fat components) for preparing the interesterified base oil typically comprise fatty acid esters of glycerol, for example, monoglycerides, diglycerides, and triglycerides. In many embodiments, the interesterified base oil is prepared from one or more non-tropical base oils as one or more fat components.

Examples of non-tropical base oils that may be used as a fat component include oils obtained from soybean, rapeseed (canola), sunflower, peanut, hazelnut, walnut, cottonseed, olive, corn, grapeseed, rice bran, sesame, safflower, linseed/flax, oat and wheat germ. The base oils may be natural or genetically modified or may be trait enhanced. Examples include low linolenic soybean oil, high oleic canola oil, and high oleic soybean oil. Also within the scope of non-tropical base oils are triglyceride oils that are derived from microorganisms, animals (e.g., lard, tallow, butter), and plants.

Interesterification refers to the process of rearranging the distribution of fatty acids on triglyceride molecules, resulting in melting and crystallization characteristics that are similar to partially hydrogenated oils, but without creation of trans fatty acids. Interesterification may be conducted using techniques known to those of skill in the art and may be conducted by an enzymatic process or a chemical process. Details of interesterification can be found, for example, in *Interesterification Products and Processes*" JOACS, September 1967; Vol. 41; 414A.

In many embodiments a high melt fat component for the interesterification process can comprise (or consist of or consist essentially of) glycerides of fatty acids such as monoglycerides, diglycerides, and triglycerides, that can be (and have been) hydrogenated. The glycerides have a fatty acid composition that comprises a very high percentage of saturated fatty acids. The solid fat component can be very low in trans fatty acids, because only a very few of the fatty acids have residual sites of unsaturation.

In many embodiments, the high melt point fat component useful for interesterification can be produced by (i) fractionation or (ii) hydrogenating unsaturated fatty acids present in a non-tropical base oil, to increase the amount of saturated fatty acids. Techniques for hydrogenation of vegetable oils are known in the art and include, for example, reacting a vegetable oil having unsaturated fatty acids with hydrogen gas in the presence of a hydrogenation catalyst, for example, a supported nickel catalyst. The hydrogenated vegetable oil may be fully hydrogenated in order to achieve an iodine value (I.V.) of about 10 or less, or about 5 or less. Representative hydrogenated solid fats include hydrogenated soybean oil, hydrogenated cottonseed oil, hydrogenated canola, and mixtures thereof.

A fat component (e.g., high melt point fat components, low melt point fat components) as described is a relatively pure oil, solid fat, or semi-solid fat that is substantially free of impurities including water. A fat component can preferably exhibit a high triglyceride content, such as at least 90 or 95 percent by weight triglyceride, e.g., 98 or 99 percent by weight (or higher) triglyceride, based on the total weight of the fat component. The fat component may include low amounts of impurities such as monoglyceride, diglyceride, or fatty acids, such as less than about 2 percent by weight, e.g. less than 1 percent by weight, e.g., less than 0.5 percent by weight, or merely trace amounts, based on the total weight of the fat component. A fat component (e.g., non-tropical oil) or combination of multiple (e.g., two) different fat components that includes one or a combination of these relatively pure fat components, with no additional material or ingredient, is considered to consist of the fat component or combination of fat components. A fat component or combination of multiple (e.g., two) different fat components that includes one or a combination of these relatively pure fat components and less than one percent of additional material or ingredient, is considered to consist essentially of the fat component or combination of fat components.

Similarly, an interesterified base oil prepared from two or more fat components as recited, can include similarly low amounts of impurities such as monoglyceride, diglyceride, or fatty acids, such as less than about 2 percent by weight, e.g., less than 1 percent by weight, e.g., less than 0.5 percent by weight, or merely trace amounts, based on the total weight of the fat component. An interesterified base oil (or blend of two or more interesterified base oils) that does not contain any additional material or ingredient is considered to consist of interesterified base oil. An interesterified base oil (or blend of two or more interesterified base oils) that contains less than one percent of additional material or ingredient is considered to consist essentially of interesterified base oil.

A shortening composition or a shortening particle includes interesterified base oil as described, and may optionally include additional ingredients such as flavorants, preservatives, water, colorants, or additional fat or oil, e.g., to provide desired color, flavor, or stability properties. As an example, a shortening composition or shortening particle may include a sweetener, colorant, (e.g., yellow, red, brown), or preservative. The total amount of these additives can be relatively low, such as below about 15 percent by weight of a shortening composition or shortening particle.

Additionally or alternatively, a shortening composition or a shortening particle may optionally include an amount of water, either in the form of absorbed water or suspended or dispersed water. If suspended or dispersed, the shortening composition may form an emulsion such as a water-in-fat (solid) emulsion, or a water-in-oil (liquid) emulsion. The amount of water may be as desired and useful, e.g., an amount that will still result in a shortening composition capable of being formed into a shortening particle. For example, a shortening composition or shortening particle may include up to about 45 weight percent water, based on the total amount of shortening composition or shortening particle (including fat, water, and other optional ingredients), e.g., from about 15 to 30 weight percent water based on the total weight of shortening composition or shortening particle (including interesterified base oil, water, and any other optional ingredients).

Additionally or alternatively, a fat composition (e.g., shortening composition or a shortening particle) may optionally include an amount of added fat ingredient, such as a liquid fat (e.g., oil). As an example, an added fat ingredient may be a partially hydrogenated or non-hydrogenated liquid fat (e.g., an oil such as soybean oil). The amount of added fat ingredient may be as desired and useful, e.g., an amount and type of added fat ingredient that will still produce a fat composition capable of being formed into a shortening particle. For example, a shortening composition or shortening particle may include up to about 20 weight percent added fat ingredient (e.g., liquid oil), e.g., from about 5 to 15 weight percent added fat ingredient (e.g., liquid oil) based on the total weight of shortening composition or shortening particle (including interesterified base oil, added fat, and any other optional ingredients). When determining stearic acid content in a fat composition (e.g., interesterified base oil, shortening composition, or shortening particle) that contains an added fat ingredient in addition to the interesterified base oil, the stearic acid content of the fat composition can be in a range to allow the fat composition to be formed into a shortening particle and desirable dough product. Preferred ranges of stearic acid content can be from about 38 to about 60 weight percent, e.g., from about 40 to about 52 weight percent stearic acid, based on the total weight of fat in the fat composition (including the interesterified base oil and any added fat ingredient).

Certain embodiments of shortening compositions and shortening particles as described can specifically not include (e.g., exclude) added ingredients, or certain types of added ingredients. For example, embodiments of shortening compositions or shortening particles may specifically exclude added fat in the form of a non-interesterified hardstock fat ingredient. Applicant's copending U.S. patent application Ser. No. 13/017,942, filed Jan. 31, 2011, provides a meaning of the term "hardstock fat." Consistent therewith, a "hardstock fat" that has not been processed by interesterification, refers to added fat that is solid at room temperature or slightly above room temperature, and that is not a product of an interesterification procedure. Hardstock fats can have a melting point (measured as MDP) ranging from about 50° C. to about 80° C. (122° F. to 176° F.), or from about 60° C. to about 70° C. (140° F. to 158° F.). Examples of hardstock fats are made up substantially of glycerides of fatty acids such as monoglycerides, diglycerides, and triglycerides. The glycerides have a fatty acid composition that comprises a relatively high percentage of saturated fatty acids and can be very low in trans fatty acids.

A hardstock fat can be prepared from one or more tropical or non-tropical base oil. Examples of non-tropical base oils include oils obtained from soybean, rapeseed (canola), sunflower, peanut, hazelnut, walnut, cottonseed, olive, corn, grapeseed, rice bran, sesame, safflower, linseed/flax, oat and wheat germ. The base oils may be natural or genetically modified or may be trait enhanced. Examples include low linolenic soybean oil, high oleic canola oil, and high oleic soybean oil. Also within the scope of non-tropical base oils are triglyceride oils derived from microorganisms, animals (e.g., lard, tallow, butter), and plants.

In many embodiments, a hardstock fat can be produced by hydrogenating unsaturated fatty acids present in a base oil, to increase the amount of saturated fatty acids. Techniques for hydrogenation are known and include, for example, reacting a vegetable oil having unsaturated fatty acids with hydrogen gas in the presence of a hydrogenation catalyst, for example, a supported nickel catalyst. The hydrogenated vegetable oil may be fully hydrogenated to achieve an iodine value (I.V.) of about 10 or less, or about 5 or less. Representative hydrogenated solid fats include hydrogenated soybean oil, hydrogenated cottonseed oil, hydrogenated palm oil, hydrogenated palm kernel oil, hydrogenated coconut oil, and mixtures thereof.

Embodiments of hardstock fats include fully-hydrogenated soybean oil that has an iodine value (I.V.) of about 5 or less. One hardstock fat comprising fully-hydrogenated soybean oil is commercially available from Stratas Foods, LLC under the trade designation "DRITEX S." DRITEX S is fully-hydrogenated flaked shortening that has a Mettler Dropping Point of 65° C. to 70° C. and has a maximum I.V. of 5.0.

Certain embodiments of shortening compositions and shortening particles include interesterified base oil as described, and not more than a relatively small amount of other (added) ingredients. Other embodiments can exclude any ingredients other than the interesterified base oil. Accordingly, embodiments of shortening compositions and shortening particles can either consist of or consist essentially of the interesterified base oil. A shortening composition or shortening particle that contains only interesterified base oil (or a blend thereof) and no additional (added) material or ingredient, is considered to consist of interesterified base oil. A shortening composition or shortening particle that contains interesterified base oil (or a blend thereof) and no more than 2 percent by weight, e.g., less than 1 percent by weight, of additional (added) materials or ingredients, based on the total weight of the shortening composition or shortening particle, is considered to consist essentially of interesterified base oil.

One well-known technique for characterizing a fat composition (such as an interesterified base oil, shortening composition, or shortening particle) is Solid Fat Content (SFC). SFC is determined for a fat sample by detecting the NMR signal from both liquid and solid components in the fat sample, or by detecting the change in the liquid signal as it is displaced by solid. AOCS methods for determining SFC include AOCS Cd 16b-93 revised in 2000 (Direct Method) and AOCS Cd 16-81 revised in 2000 (Indirect Method). Using SFC, a melting curve or SFC profile can be created by measuring SFC for a fat sample at several different temperatures, and then plotting SFC as a function of temperature. The slope of the SFC profile can be determined by using numerical methods to fit a line to the SFC values, and performing linear regression to establish the slope and intercept of the fitted line. Using this technique, a line having the linear form SFC (% solids)=m(° C.)+b can be obtained where m is the slope of the SFC profile in (% solids/° C.), and b is the y-intercept of the SFC profile in (% solids).

Fat compositions as described herein (e.g., an interesterified base oil, a shortening composition, a shortening particle) can have a relatively flat slope (i.e., a relatively smaller negative slope) for an SFC profile. In certain exemplary embodiments, the slope of the SFC profile ranges from about −1.1 to about −1.3 (% solids/° C.), more typically ranging from about −1.10 to about −1.20 (% solids/° C.). A flat SFC slope is desirable because flakes prepared with a composition having a flat SFC profile are more stable as a particle, because the composition does not melt as easily with small temperature variations that may occur during manufacturing, shipping, and storage conditions.

Figure 3:
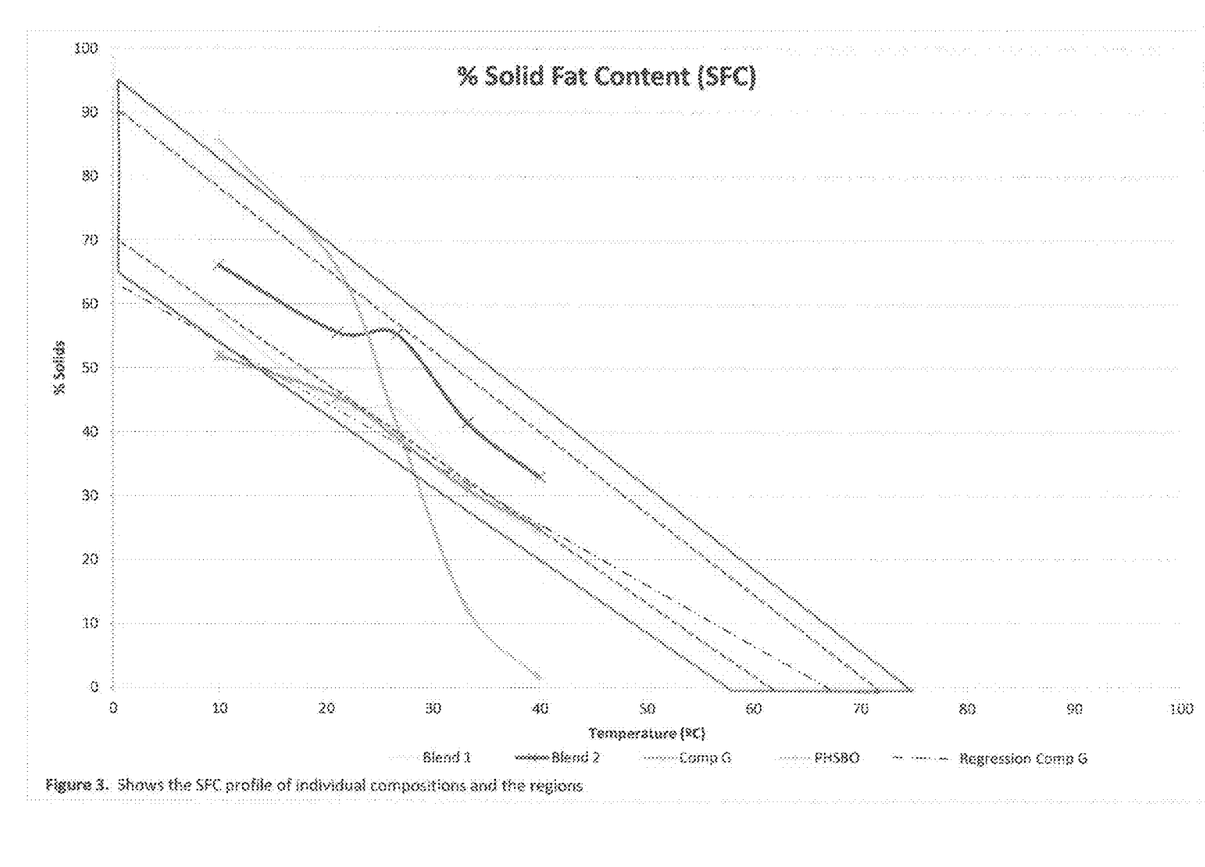
FIG. 3 is a graph displaying SFC profile regions for various shortening particle compositions of the invention.

FIG. 3 displays SFC profiles for various fat particle compositions. As shown in FIG. 3, an SFC profile for a shortening particle as described herein can exhibit a relatively lower (i.e., flatter) slope compared to other fat particle compositions. In the embodiment shown in FIG. 3, the SFC profile of the shortening particle composition of the invention can be fitted to the linear equation:

$$y=mx+b$$

where
 y is SFC in % solids;
 m ranges from about −1.0 to −1.4 (% solids/° C.);
 x is the temperature in ° C.; and
 b ranges from about 65 to about 95 (% solids).
More typically, m can range from about −1.1 to about −1.3 (% solids/° C.) or from about
−1.1 to about −1.2 (% solids/° C.). More typically, b can range from about 70 to about 90 (% solids) or from about 70 to about 80 (% solids).

Also useful in characterizing fat compositions as described herein the invention (e.g., an interesterified base oil, a shortening composition, a shortening particle) are the x-intercept and y-intercept of the SFC profile. The y-intercept represents the SFC for the composition at a temperature of 0° C. In many embodiments, the y-intercept of the SFC profile ranges from about 65% to about 95% solids, or from about 70% to 90% solids. The x-intercept of the SFC profile represents the temperature at which the SFC is 0%. Due to the flat SFC profile, the x-intercept for shortening compositions of the invention takes place at a higher temperature than is typically observed for conventional shortening particle compositions. In many embodiments, the x-intercept of the SFC profile ranges from about 58° C. to about 75° C., or from about 62° C. to about 72° C.

In some embodiments, the SFC profile of a fat composition as described (e.g., an interesterified base oil, a shortening composition, a shortening particle) can be contained within an area bound on the x-axis by about 58° C. to about 75° C. and bound on the y-axis by about 65 to about 95 (% solids/° C.). This area can be represented graphically as shown in FIG. 3. In another embodiment, the area is bound on the x-axis by about 62° C. to about 72° C. and bound on the y-axis by about 70 to about 90 (% solids/° C.). These embodiments are represented graphically in FIG. 3 whereby the areas bound by the solid and dotted lines represent SFC profile ranges of embodiments of the invention. For comparison purposes, "Comp G" along with the corresponding linear regression line is included. In addition, the steep profile of conventional shortening flakes of partially hydrogenated soybean oil (PHSBO) is included.

Figure 2:
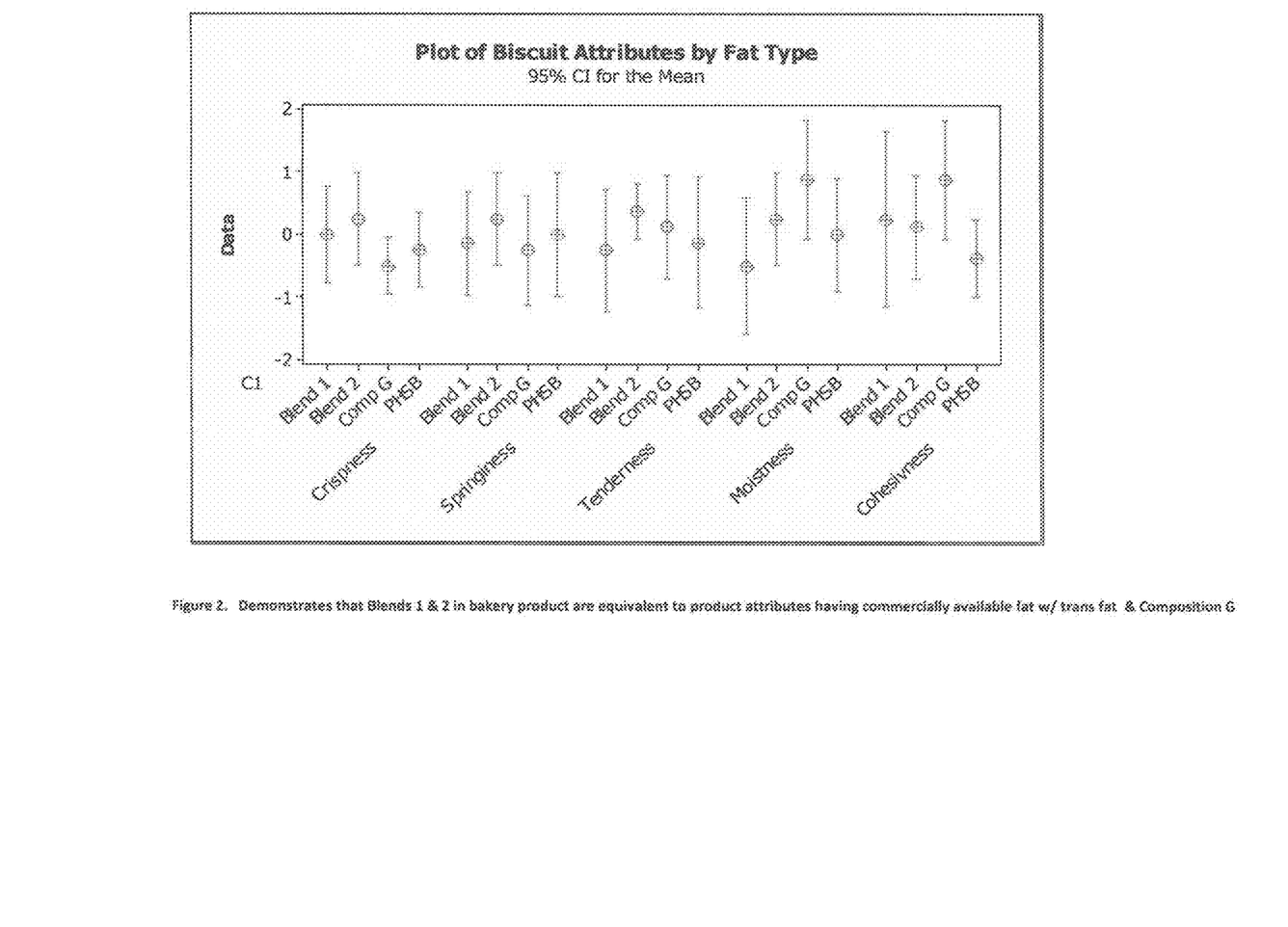
FIG. 2 is a graph displaying positive/equivalent finished product attributes in this embodiment compared to a commercially available shortening flakes containing trans fatty acids.

Fats and fat compositions as described (e.g., an interesterified base oil, a shortening composition, a shortening particle) can exhibit a Mettler Dropping Point (MDP) that is higher than the Mettler Dropping Point for shortening flakes typically used in baked dough products. Specifically, certain conventional shortening particle compositions have a Mettler Propping Point below about 50° C. (122° F.). In many embodiments, a fat composition can exhibit a Mettler Dropping Point (MDP) in a range from about 54° F. to about 66° F. or from about 135° F. to about 145° F., or as otherwise described herein. Despite such a relatively higher melting point, a shortening particle as otherwise described herein can be incorporated into a baked dough product in a manner that will provide acceptable or desirable sensory attributes and physical property attributes as shown in FIG. 2. A higher melting point is also advantageous because it can make shortening particles more tolerant of exposure to high temperature without appreciably adhering to one another. This allows shortening particles to be more easily transported, stored, and used in manufacturing processes.

In many embodiments, an interesterified base oil, shortening composition, or shortening particle as described herein can be low in saturated fatty acids, trans fatty acids, or total combined saturated fatty acids and trans fatty acids. Trans-fatty acids refer to fatty acids that include a carbon-carbon double bond that is present in the trans configuration. Saturated fatty acids refers to fatty acids that do not contain any sites of unsaturation, for example, carbon-carbon double bonds.

In representative embodiments, an interesterified base oil, shortening composition, or shortening particle, can contain about 2 weight percent or less trans fatty acids, based on total weight fat. In other representative embodiments, an interesterified base oil, shortening composition, or shortening particle, can contain about 68 weight percent or less saturated fatty acids based on total weight fat. Still other representative embodiments contain about 55 weight percent or less total for both trans fatty acids and saturated fatty acids based on total weight fat.

In many embodiments, a fat composition as described can display a rapid crystallization rate as compared to other known fat or shortening particle compositions. A rapid crystallization rate is advantageous in that it allows the shortening particle composition to be rapidly cooled and crystallized during the process of preparing shortening particles. The crystallization rates can be measured by shock-cooling the molten oil blend and then measuring the percent solids with time progression using Nuclear Magnetic Resonance (NMR) techniques.

Figure 4:
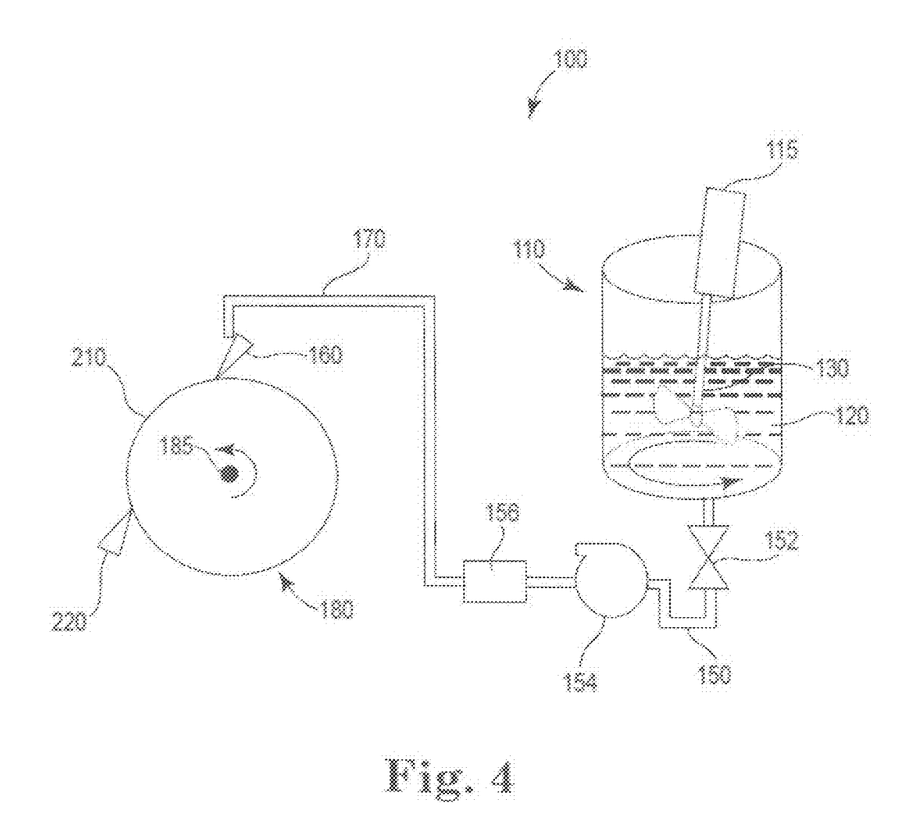
FIG. 4 is a representative apparatus suitable for making shortening particles of the invention.

Shortening particles as described may be prepared using a flaking apparatus as shown in FIG. 4. Referring to FIG. 4, flaking apparatus 100 includes fat reservoir 110 that holds the shortening composition 120 that is to be flaked. Mounted in reservoir 110 is high shear mixer 115 that is equipped with a high shear-mixing blade 130. Examples of suitable high shear mixers include Breddo, IKA Rototron, Ross brand high shear mixers, and LIGHTNIN brand variable speed high shear mixers. Fat reservoir 110 is connected to jacketed piping 150, which includes valve 152, pump 154, and flow meter 156. Temperature controlled chute 160 is mounted in close proximity to flaking roll 180 for application of the shortening composition 120 to the outer surface 210 of the flaking roll 180. Flaking roll 180 is rotatably mounted so that during operation of apparatus 100, the flaking roll 180 rotates about its axis 185. A scraping blade 220 is positioned in contact with the outer surface 210 of the flaking roll 180 in order to scrape the solidified shortening composition 120 from the surface of the flaking roll 180.

Figure 4A:
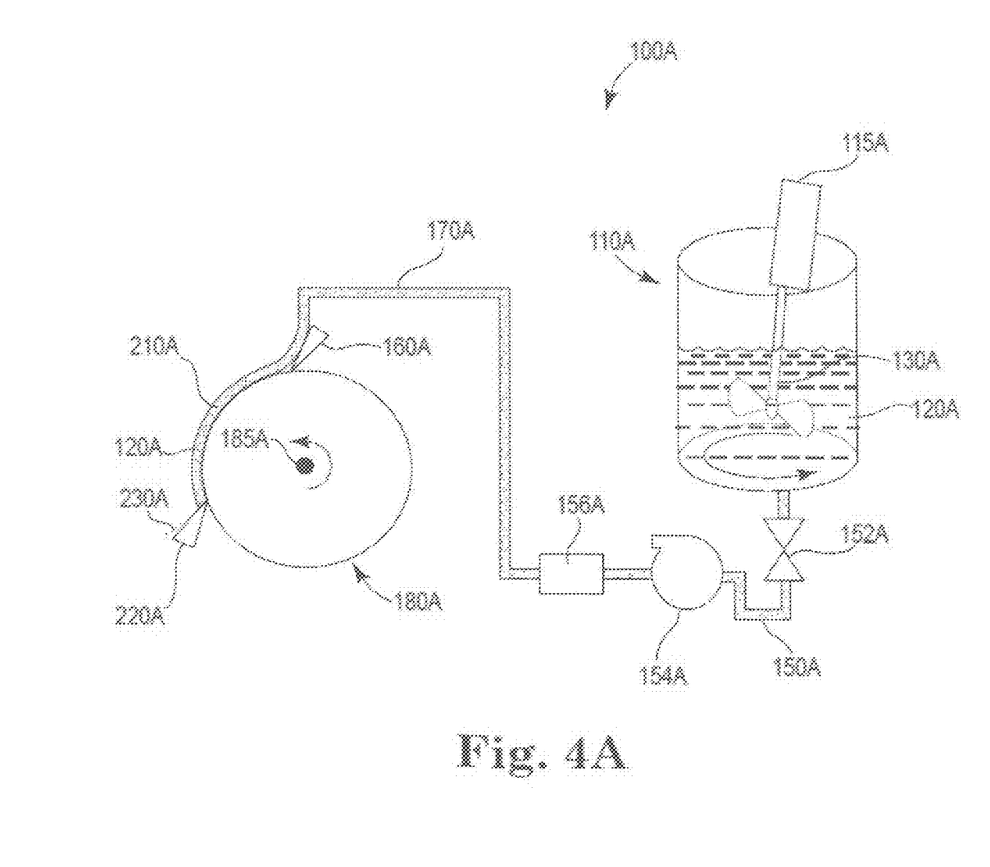
FIG. 4A is the apparatus of FIG. 4 shown being used to make shortening particles of the invention.

FIG. 4A shows a schematic representation of apparatus 100A being used to produce shortening flakes of the invention. In operation of apparatus 100A, a shortening composition of the invention 120A is first prepared in reservoir 110A. The high shear mixer 115A is used to mix shortening composition 120A. After preparing the shortening composition 120A, the composition is then pumped through jacketed piping 150A to temperature controlled chute 160A. The shortening particle composition 120A is typically maintained at a temperature ranging from about 60° C. to about 70° C. At temperature controlled chute 160A, the shortening composition 120A is applied to the outer surface 210A of flaking roll 180A in the form of a thin coating. The coating is typically applied at a thickness of about 0.5 mm to about 2.0 mm. During application of the shortening composition 120A, the flaking roll 180A is rotated about its axis 185A. Cooling is supplied to the flaking roll 180A to cool the shortening composition 120A as it is in contact with the outer surface 210A of the flaking roll 180A. As the flaking roll 180A rotates about its axis 185A, the shortening composition 120A cools to a temperature below its melting point and solidifies on the outer surface 210A of the flaking roll 180A. After it is solidified, the shortening composition 120A is scraped from the outer surface 210A of flaking roll 180A by scraping blade 220A that is positioned in contact with the outer surface 210A of the flaking roll 180A. The scraping blade 220A causes the solidified shortening composition 120A to be dislodged from the outer surface of the flaking roll 210A in the form of thin sheets or flakes 230A. The flakes 230A are then collected:

Particle dimensions may be controlled, for example, by factors such as the depth of the shortening composition 120A in the trough (not shown), the fat composition temperature at the point of deposit, the surface temperature of the rotating drum, and the rotation speed of the drum. For example, in many embodiments, the shortening particle composition is deposited at a temperature ranging from about 50° C. to about 65° C., more typically ranging from about 56° C. to about 60° C. In many embodiments, the depth of the fat composition in the trough ranges from about 2 inches to about 4 inches. In many embodiments the surface temperature of the drum ranges from about 0° C. to about −10.0° C., more typically ranging from about −3.0° C. to about −5.0° C. The "trough" is at the top of the roll, directly under the deposit point. The oil depth is controlled by (1) the rate of deposition of the oil (grams/minute), and (2) the speed of the roll (meters/minute).

Shortening particles as described may be used to prepare various dough compositions, dough articles, and baked dough products. The dough compositions typically comprise flour, water, one or more leavening agents, and may also include other optional ingredients as described herein. The dough composition may be a developed dough composition or an undeveloped dough composition. Representative dough compositions include biscuits, pizza crusts, pot pie crusts, cinnamon rolls, and various bread doughs.

The dough compositions may include one or more types of flour, such as about 15% wt. or greater flour based on the total weight of the dough composition. Wheat flour may be obtained commercially from such sources as ADM Milling; Bay State Milling Co.; Conagra Inc.; General Mills, Inc.; Horizon Milling, LLC; and Rohstein Corp.

A useful dough composition can include liquid components, for example, water, milk, eggs, and oil, or any combination of these. Water is present to provide desired rheology. Water may be added during processing in the form of ice, to control the dough temperature during processing; the amount of any such water used is included in the amount of liquid components. The precise amount of water depends on factors known to those skilled in the dough making art including, for example, whether the dough composition is a developed or under-developed composition.

Water may be present in dough compositions of the invention in an amount of about 15% wt. or greater. In developed compositions, the amount of water from all sources, for example, water, eggs, milk, etc. should not be so high that the dough composition becomes soft and cannot maintain its desired closed-cell structure including bubbles of carbon dioxide and water vapor. Also, the amount of water should not be so low that the dough composition is dry and has no ability to expand.

A dough composition can be caused to expand (i.e., leaven) by any leavening mechanism, such as by one or more of the effects of: entrapped gas, such as entrapped carbon dioxide, entrapped oxygen, or both; by action of chemical leavening agents; or by action of a biological agent, such as a yeast. Thus, a leavening agent may be an entrapped gas, such as layers or cells (bubbles) that contain carbon dioxide, water vapor, or oxygen, etc.; any type of yeast (e.g., cake yeast, cream yeast, dry yeast, etc.); or a chemical leavening system (e.g., containing a basic chemical leavening agent and an acidic chemical leavening agent that react to form a leavening gas, such as carbon dioxide).

In some embodiments, a dough composition can be yeast-leavened. As used herein the term "yeast-leavened" refers to dough compositions that are leavened primarily due to the production of gaseous metabolites of yeast; chemical leavening agents may optionally be present, but in minor amounts, preferably less than about 10% wt. chemical leavening agent based on the total weight of the leavening agent (yeast and chemical leavening agent) or may not be present at all. The yeast may be any suitable yeast known to those of skill in the art, for example, fresh cream/liquid yeast, fresh compressed yeast, active dry yeast, and instant yeast. In some embodiments, the yeast is fresh compressed yeast (e.g., in cake or crumbled form) comprising about 65% to about 75% water and about 25% to about 35% yeast. The amount of yeast can be an amount that will produce a desired volume of gaseous metabolites, as known to one of skill in the art. The amount of yeast present in the dough composition can be up to about 10% wt. (e.g., about 2% wt. to about 8% wt. for developed dough compositions, and less than about 1% wt. to about 5% wt. for under-developed compositions).

In some embodiments a chemical leavening agent may be used in addition to or as an alternate to a yeast leavening agent. Acidic chemical leavening agents (or acid agents) that may be useful include those generally known in the dough and bread-making arts. Acidic agents may be relatively soluble within different temperature ranges and may or may not be encapsulated. Examples of acidic agents include sodium aluminum phosphate (SALP), sodium acid pyrophosphate (SAPP), monosodium phosphate, monocalcium phosphate monohydrate (MCP), anhydrous monocalcium phosphate (AMCP), dicalcium phosphate dehydrate (DCPD), glucono-delta-lactone (GDL), an others. Commercially available acidic chemical leavening agents include those sold under the trade designations "LEVN-LITE" (SALP); "PAN-O-LITE" (SALP+MCP); "STABIL-9" (SALP+AMPC); "PY-RAN" (AMCP); and "HT MCP" (MCP).

A dough composition may also include encapsulated basic chemical-leavening agents. Useful basic chemical leavening agents are known in the dough and bread-making arts, and include soda (i.e., sodium bicarbonate, $NaHCO_3$), potassium bicarbonate ($KHCO_3$), ammonium bicarbonate ($NH_4HCO_3$), etc. Encapsulating the basic chemical leavening agent provides separation between the basic agent and the bulk of the dough composition. If present, chemical leavening agents can comprise less than about 5% wt of the dough composition (e.g., less than about 3.5% wt. or less than about 0.3% wt.).

To provide a fat component, examples of dough compositions can include the shortening particles as fat, with no additional fat. Alternately, other exemplary dough compositions may include the shortening particles, and may optionally include one or more additional fat component ("dough fat") added to the dough composition at the time the dough is prepared and substantially interspersed and distributed throughout the dough composition. The amount of fat in a dough composition from the described shortening particles can be based on the type of dough composition being prepared, but may be in a range from about 1% wt to 30% wt, e.g., from 7% wt to 20% wt, or from 10% wt to 15% wt. More specifically, a dough may include up to about 30 percent by weight of shortening particles if the dough is to be a high fat content dough (e.g., a high fat content pot pie crust); a chemically-leavened (soda) biscuit dough may include from 7 wt % (for a low-fat biscuit) to 15 wt % shortening particles.

In addition to the shortening particles, a dough may also contain additional (optional) fat component ("dough fat"). The type and amount of this additional "dough fat" are not particularly limited. Amounts in the range from 1 to 5 wt % (based on the total weight of the dough composition) may be typical for use in combination with above-identified amounts of shortening particles, but higher amounts may also be useful. The optional "dough fat" component may be derived from any source, such as vegetable, dairy and marine sources including butter oil or butterfat, soybean oil, corn oil, rapeseed or canola oil, copra oil, cottonseed oil, fish oil, safflower oil, olive oil, sunflower oil, peanut oil, palm oil, palm kernel oil, coconut oil, rice bran oil and other plant derived oils, such as vegetable or nut oils. Examples of shortenings include animal fats, such as lards, butter and hydrogenated vegetable oils, such as margarine. Mixtures of different fats may also be used. The type and amount of additional, optional fat ("dough fat") will depend on the type of dough product being produced, with certain doughs including vegetable based fat (e.g., soybean oil), either hydrogenated or partially hydrogenated oil, if at all.

The dough composition may optionally include one or more sweeteners, natural or artificial, liquid or dry. If a liquid sweetener is used, the amount of other liquid components may be adjusted accordingly. Examples of suitable dry sweeteners include lactose, sucrose, fructose, dextrose, maltose, corresponding sugar alcohols, and mixtures thereof. Examples of suitable liquid sweeteners include high fructose corn syrup, malt, and hydrolyzed corn syrup. Often, dough compositions include up to about 8% wt sweetener.

The dough composition may optionally include additional flavorings, for example, salt, such as sodium chloride and/or potassium chloride; whey; malt; yeast extract; inactivated yeast; spices; vanilla; natural and artificial flavors; etc.; as is known in the dough product arts. The additional flavoring can be included in an amount in the range from about 0.1% wt to about 10% wt of the dough composition (e.g., from about 0.2% wt to about 5% wt of the dough composition.

The dough composition may optionally include particulates, such as raisins, currants, fruit pieces, nuts, seeds, vegetable pieces, and the like, in suitable amounts.

The dough composition may optionally include other additives, colorings, and processing aids, for example, gliadin (e.g., less than about 1% to improve extensibility (such as measured by a Brabender Extensograph) in under-developed dough), emulsifiers include lecithin, diglycerides, polyglycerol esters, and the like, (e.g., diacetylated tartaric esters of monoglyceride (DATEM) and sodium stearoyl lactylate (SSL)).

In certain embodiments, shortening particles as described can be used to prepare laminated dough compositions. Generally, a laminated dough can be prepared by the steps of: (a) providing a layer of a dough composition comprising flour and water; (b) applying a plurality of shortening particles of the invention to a surface of the dough layer; (c) repeatedly folding and compressing (i.e., sheeting) the dough layer to form a laminated dough comprising a plurality of layers of dough separated by layers of shortening.

Shortening particles of the invention may also be used in non-laminated dough compositions, for example, biscuits. In those applications, shortening particles are mixed into the dough composition prior to further packaging or processing, such as sheeting, forming, extruding or cutting.

The invention will now be described with reference to the following non-limiting examples.

EXAMPLES

Examples ("Blend") 1 & 2, Theoretical Compositions ("J, K, L, M") and Comparative ("Comp.") A-H The compositions listed in TABLE A will be referred to throughout the Examples. Theoretical compositions J, K, L, and M were not physically prepared, but their compositions (e.g., stearic acid content) were mathematically determined, and their properties were estimated.

The Samples of TABLE A include interesterified oil compositions made by interesterification of two base oils, and formed into shortening particles (other than Theoretical Examples J, K, L, and M). The total combined stearic acid content of separate base oils provided before esterification, and the total stearic acid content after esterification of the base oils, which are the same, is recited (% Stearic Acid). The materials of Comp A, Comp B, Blend 1, and Blend 2, are (e.g., consist of) the interesterified oil composition having the stearic acid content listed, and no other ingredient or material such as hard stock added to the interesterified base oil. Samples Comp C, Comp D, Comp E, Comp F, Comp G, and Comp H, include (e.g., comprise) interesterified oil compositions having the stearic acid content listed, and also contain an amount of added hard stock as listed. Each Sample was formed into shortening particles.

TABLE A

| Sample ID | % Added Hard Stock | % Stearic Acid | % Trans |
|---|---|---|---|
| Comp A | 0% | 10 | 55% |
| Comp B | 0% | 36 | <2% |
| Comp C | 2% | 37 | <2% |
| Comp D | 4% | 38 | <2% |
| Comp E | 6% | 39 | <2% |
| Comp F | 8% | 40 | <2% |
| Comp G | 15% | 43 | <2% |
| Blend 1 | 0% | 40 | <2% |
| Theoretical J | 0% | 44 | <2% |
| Blend 2 | 0% | 52 | <2% |
| Theoretical K | 0% | 56 | <2% |
| Comp H | 50% | 60 | <2% |

TABLE A-continued

| Sample ID | % Added Hard Stock | % Stearic Acid | % Trans |
|---|---|---|---|
| Theoretical L | 0% | 60 | <2% |
| Theoretical M | 0% | 68 | <2% |

The shortening compositions of TABLE A (except Theoretical J, K, L, M) were tested for SFC using AOCS Official Test Method Cd 16b-93 entitled "Solid Fat Content (SFC) by Low-Resolution Nuclear Magnetic Resonance—The Direct Method." The SFC results (slope and intercept) of the SFC profile of selected examples and a comparative (COMP G) are provided in TABLE B and in FIG. 3.

The shortening compositions of TABLE A (except Theoretical J, K, L, M) were tested for Mettler Dropping Point (MDP) using AOCS Official method Cc 18-80 entitled "Dropping Point." The MDP results are provided in TABLE B.

The shortening compositions of TABLE A (except Theoretical J, K, L, M) were evaluated for the ability to be flaked using a conventional chilled roll flaking apparatus as described below.

1. The compositions were melted together in a hand-agitated, steam-heated process kettle to a temperature of 60° C. The formulas are shown in TABLE A.

2. The molten blends were deposited onto a cold flaking roll. The molten blends were each deposited onto the flaking roll at a temperature of about 60° C., where the surface temperature of the flaking roll was about −3.3° C. As the drum rotated the molten blend cooled and fractured into solid particles, which either fall off under gravity, or were scraped off at the rear of the roll.

3. The flaking roll speed was controlled through a VFD, which was adjusted to the desired speed to achieve flakes of the desired thickness. The roll was chilled using a 50%/50% mix of water and glycol with the incoming temperature of the coolant at −11.8° C., and an exit temperature of −10.8° C.

4. The residence time of the molten material on the flaking roll was ~47 seconds, and the roll was turning at a rate of ~2.44 M/min. Flakes being generated from this residence time had variable thicknesses ranging from 1 mm-1.5 mm.

The shortening compositions were evaluated for acceptability for use in a biscuit.

Biscuits were prepared as described below.

1. Biscuits were prepared using the formulation provided below.

| Ingredient | % wt. |
|---|---|
| Hard Wheat Flour | 36.0 |
| Soft Wheat Flour | 9.0 |
| Water | 32.0 |
| Shortening Flakes | 12.0 |
| Leavening Ingredients | 4.0 |
| Other Dry Ingredients | 6.0 |
| Other Liquid Components | 1.0 |
| Total | 100.0 |

2. The dry ingredients were added to a Hobart 200 brand mixer fitted with a dough paddle, and were blended at low speed at room temperature (21° C. (70° F.)) for 45 seconds to a uniform mixture.

3. Water at 10° C. (50° F.) was added to the dry, blended ingredients under low speed agitation, and then the speed was increased to medium and the ingredients were mixed at room temperature for an additional 3 minutes.

4. The resulting dough was removed from the mixer and was placed on a table-top reversible sheeter. The dough was passed through sheeting rolls to obtain a final thickness of approximately 20 mm. When this thickness was achieved, the dough was removed from the sheeter and was placed on a table for cutting.

5. A hand cutter was used to produce round biscuit pieces from the dough sheet. Individual raw dough pieces were placed on an aluminum baking sheet, and then the entire baking sheet was placed in a plastic bag. The bag of raw dough pieces was then placed in a freezer at −23° C. (−10° F.) for a minimum of 3 days.

6. The frozen biscuits were removed from the freezer and bag and were placed on a room temperature baking tray. The biscuits were baked in a reel oven at 190° C. (375° F.) for 12 minutes.

7. The finished biscuits were removed from the oven and were tempered for 10 minutes, prior to evaluation for flavor and texture.

8. The baked biscuits were team judged by 8 individuals for flavor and texture as compared to a control biscuit that contained a partially hydrogenated, 100% soybean shortening flake. If the both flavor and texture of the test biscuit was determined by the team to be not substantially different from the control biscuit, then the test biscuit was judged to be an adequate biscuit flake. The results of the biscuit evaluation are shown in TABLE B and selected examples and comparative in FIG. 2. Typically, the mode of failure was lack of discrete fat particles prior to baking and/or an unacceptable waxy mouth-feel that was a function of the fully hydrogenated portion of the composition. The occurrence of waxy mouth-feel started at about the 60% stearic acid (TABLE B).

cited herein are hereby incorporated by reference as if individually incorporated.

The invention claimed is:

1. Shortening particles consisting essentially of interesterified base oil having a stearic acid content of about 38 weight percent to about 56 weight percent and a Mettler Dropping Point of about 54° C. to about 66° C., and having an SFC profile that fits the equation $$y = mx + b,$$

where:
y is the solid fat content (SFC) in % solids;
m is a slope of the SFC profile which ranges from about −1.0 to about −1.4 (% solids/° C.);
x is the temperature in ° C.; and
b is the y-intercept of the SFC profile;
where the SFC profile slope is determined by plotting SFC values as a function of temperature, the SFC values measured at 10° C., 21.1° C., 26.7° C., 33.3° C., and 40° C., fitting a line to the SFC values using numerical methods, and using linear regression to establish the slope and y-intercept of the fitted line.

2. Shortening particles according to claim 1 wherein the stearic acid content is about 40 weight percent to about 52 weight percent.

3. Shortening particles according to claim 1 wherein the shortening particles comprise less than about 2% wt. total trans fatty acids.

4. Shortening particles according to claim 1 wherein the shortening particles comprise less than about 68% wt. saturated fatty acids.

5. Shortening particles according to claim 1 wherein the shortening particles have an SFC profile having an x-intercept ranging from about 58° C. to about 75° C.

6. Shortening particles according to claim 1 wherein the y-intercept ranges from about 65% to about 95% solids.

TABLE B

| Sample ID | % Stearic Acid | Acceptable Flake | Acceptable Biscuit | Slope (% solids/deg C.) | Y Intercept (% solids) | MDP (Deg C.) |
|---|---|---|---|---|---|---|
| Comp A | 10 | Yes | Yes | −3.022 | 120 | 40 |
| Comp B | 36 | No | No | −0.948 | 35 | 52 |
| Comp C | 37 | No | No | −0.915 | 40 | 53 |
| Comp D | 38 | Yes | Yes | −0.835 | 45 | 55 |
| Comp E | 39 | Yes | Yes | −0.848 | 47 | 56 |
| Comp F | 40 | Yes | Yes | −0.865 | 50 | 57 |
| Comp G | 43 | Yes | Yes | −0.932 | 63 | 61 |
| Blend 1 | 40 | Yes | Yes | −1.114 | 69 | 58 |
| Theoretical J | 44 | Yes | Yes | — | — | — |
| Blend 2 | 52 | Yes | Yes | −1.100 | 79 | 61 |
| Theoretical K | 56 | Yes | Yes | — | — | — |
| Comp H | 60 | Yes | No | −0.444 | 73 | 66 |
| Theoretical L | 60 | Yes | No | — | — | — |
| Theoretical M | 68 | Yes | No | — | — | — |

Other embodiments of this invention will be apparent to those skilled in the art upon consideration of this specification or from practice of the invention disclosed herein. Various omissions, modifications, and changes to the principles and embodiments described herein may be made by one skilled in the art without departing from the true scope and spirit of the invention which is indicated by the following claims. All patents, patent documents, and publications 7. Shortening particles according to claim 1 wherein the interesterified oil consists essentially of hydrogenated soybean oil and non-hydrogenated soybean oil.

8. Shortening particles according to claim 1 wherein the shortening particles comprise dispersed water.

9. The shortening particles of claim 1, wherein the interesterified base oil is derived from non-tropical oils.

* * * * *